No. 810,344. PATENTED JAN. 16, 1906.
E. PIERCE & E. LAUX.
LAWN TRIMMER.
APPLICATION FILED MAR. 30, 1905.

2 SHEETS—SHEET 1.

Witnesses
Milton C. Lenoir.
Watts T. Estabrook.

Inventors
Edward Pierce &
Edward Laux
by Rhea G. DuBois
their Attorneys

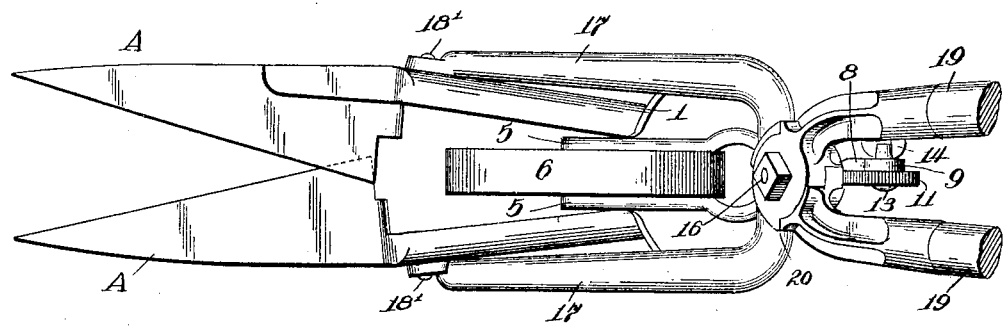
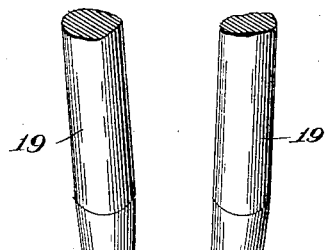
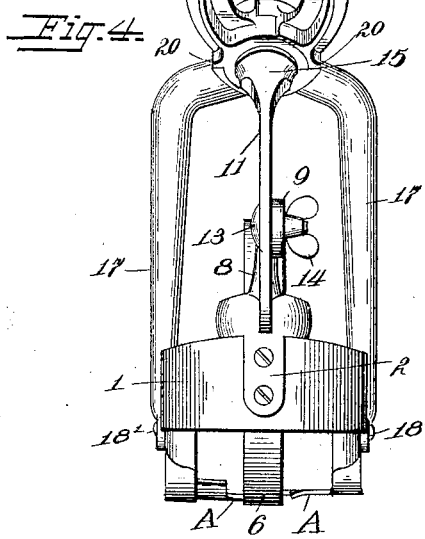
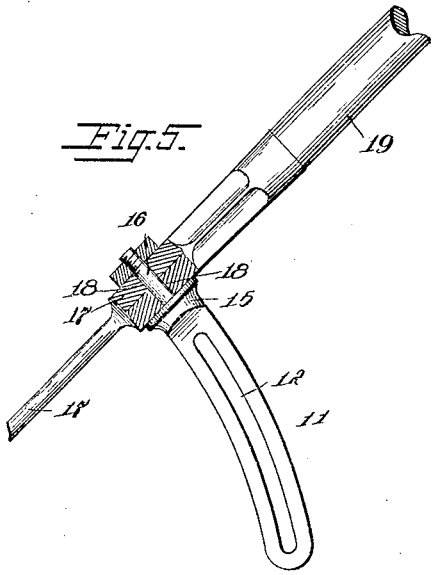

UNITED STATES PATENT OFFICE.

EDWARD PIERCE AND EDWARD LAUX, OF BURLINGTON, IOWA.

LAWN-TRIMMER.

No. 810,344. Specification of Letters Patent. Patented Jan. 16, 1906.

Application filed March 30, 1905. Serial No. 252,905.

*To all whom it may concern:*

Be it known that we, EDWARD PIERCE and EDWARD LAUX, citizens of the United States, residing at Burlington, in the county of Des Moines and State of Iowa, have invented certain new and useful Improvements in Lawn-Trimmers, of which the following is a specification.

Our invention relates to an improvement in lawn-trimmers, and the object is to provide a simple device for trimming up lawns around flower-beds, sidewalks, fences, or other places where the lawn-mower will not reach without the necessity of getting down on the hands and knees or stooping over, as is generally customary.

With these and other objects in view our invention consists in the main of a pair of grass-shears, a frame to which they are secured, a wheel, and extension-handles adjustably connected with the frame upon which they are fulcrumed and attached to the shears whereby the operator is enabled to manipulate while standing in an erect position and obtain a powerful leverage whereby the shears may be operated with comparative ease and without making the trimming operation laborious, tedious, and ineffectual.

Our invention further consists in certain novel features of construction and combinations of parts, which will be hereinafter described, and pointed out in the claims.

Figure 1:
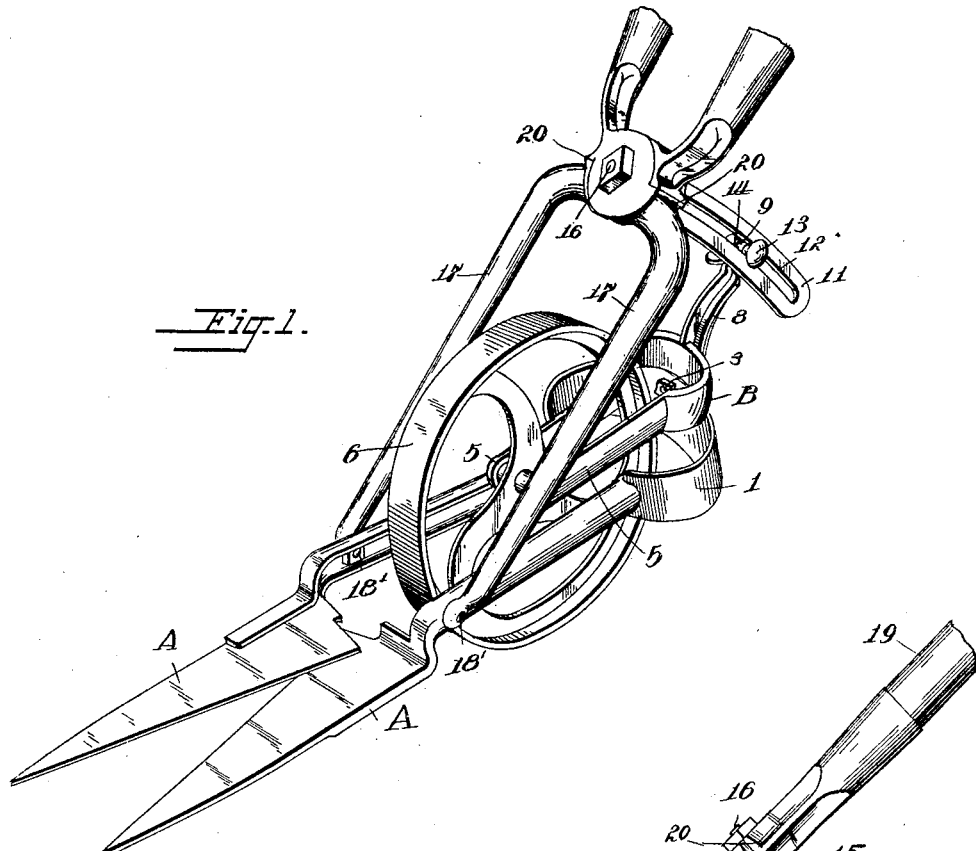
Figure 2:
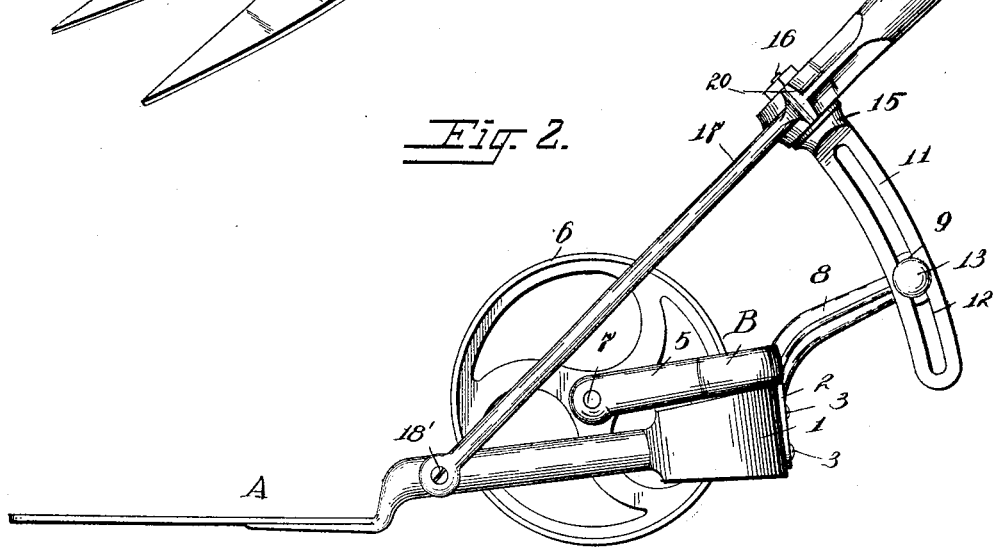

In the accompanying drawings, Figure 1 is a view in perspective. Fig. 2 is a view in side elevation. Fig. 3 is a plan view. Fig. 4 is a rear elevation, and Fig. 5 is detail showing the curved segment 11 in elevation and the crossed portions of the operating-levers 17 17 in section.

A A represent an ordinary pair of grass-shears, such as are used for trimming around the edges of lawns, flower-beds, fences, and the like, the blades being connected together by a strong spring 1 at the rear, which normally holds the blades open or apart.

B indicates a frame, preferably in the form of a single casting, it having a depending lug 2, to which the spring 1 of the shears is secured by the bolts 3 3 or equivalent means. Projecting forwardly are a pair of jaws 5 5, and between these the wheel 6 is located, it being journaled on a pin 7, secured at its ends in the ends of the jaws. A shank 8 projects rearwardly, it being provided at the extreme end, preferably, with an offset 9. A curved segment 11, having an elongated curved slot 12, is adjustably secured to this offset portion by means of a bolt 13, extending through an orifice in the offset 9, and the bolt is provided with a thumb-nut 14, by which it is secured in place, the segment being adjustable up and down with respect to the shank and frame. On its upper end the segment is provided with a head 15 and a screw-threaded bolt 16.

Crossed operating-levers 17 17 are provided with orifices 18 18, which receive the bolt 16 and rest upon the head 15. The lower ends of these cross operating-levers are connected with the opposite sides of the shears by bolts 18' 18' or equivalent means. The curvature of the elongated slot 12 is struck in the arc of a circle of which these bolts or pivots 18' 18' are the center, so that when the operating-levers are adjusted they are swung from these points of attachment and in this manner the inclination or elevation of the levers is regulated and the handles 19 19 therein are brought to the desired elevation and inclination to suit the convenience of the operator. When so adjusted, the thumb-nut 14 is tightened up and they retain that elevation. Where the levers cross, shoulders 20 20 are formed. These act as stops to prevent the blades of the shears from opening too far, the spring of the shears being of sufficient strength to normally throw the blades open and the handles apart.

With a machine of this character the operator is able to walk along in an erect posture and trim the grass where the lawn-mower will not reach, and a single blade may be cut, as well as a bunch of grass, with perfect ease. The points of the blades project far ahead of the framework of the machine, and consequently reach around where a sickle or any other form of cutter would not. All the operator has to do is to force the handles toward each other to cut the grass and then permit the spring to act to throw them apart. The handles are of sufficient length so that a powerful leverage is provided, and the ends of the crossed operating-levers are relatively short from the fulcrum to the shears. The parts of the frame, including the segment, are perfectly rigid when set and their relative position with respect to the shears is fixed and rigid, and the wheel serves as a means of support for the shears and as antifriction device in moving the trimmers along the edge of the curb or part to be trimmed.

It is evident that the machine will effectually perform its function. It is simple, composed of few parts, any of which may be easily and quickly renewed and replaced; also, the machine is capable of being packed away in small compass for shipment.

Having fully described our invention, what we claim as new, and desire to secure by Letters Patent, is—

1. A lawn-trimmer comprising a frame, means for supporting the latter as it is pushed along the ground, shears carried by the frame, handles connected with the shears, a shank on the frame, and means extending from the handles to the shank for varying the angle or inclination of the handles with respect to the shears and maintaining such angle or inclination.

2. A lawn-trimmer comprising a support, a frame, shears carried by the frame and sustained by the support and handles connected with the rear end of the frame in rear of the support and with the shears forward of the support whereby a predetermined relation between shears and handles is maintained and the position of the shears is within the control of the operator at all times.

3. A lawn-trimmer comprising shears, a frame to which they are secured, cross-levers connected with the shears and a segment adjustably connected with the frame, upon which segment the levers are fulcrumed.

4. In lawn-trimmers, the combination with spring-shears, a frame rigidly secured to said shears, and a wheel upon which the frame is supported, of a segment adjustably connected with the frame, cross-levers fulcrumed on the segment and connected with the blades of the shears.

5. In lawn-trimmers, the combination with spring-shears, a frame rigidly secured to said shears, and a wheel upon which the frame is supported, of a segment adjustably connected with the frame, cross-levers fulcrumed on the segment and connected with the blades of the shears, and shoulders or stops formed on the levers for limiting the spread of the shears.

6. In a lawn-trimmer, the combination with spring-shears, a frame having a lug to which the shears are secured, the frame provided with a pair of forwardly-projecting jaws, a wheel journaled between the jaws and a rearwardly-projecting shank, of a segment connected with the shank, cross-levers fulcrumed on said segment and connected with the blades of the shears.

7. In a lawn-trimmer, the combination with spring-shears, a frame having a lug to which the shears are secured, the frame provided with a pair of projecting jaws, a wheel journaled between the jaws, and a rearwardly-projecting shank, of a segment adjustably connected with the shank, cross-levers fulcrumed on said segment, and connected with the blades of the shears.

In testimony whereof we affix our signatures in presence of two witnesses.

EDWARD PIERCE.
EDWARD LAUX.

Witnesses:
W. G. CLARK,
VERNON E. HODGES.